US012625407B2

(12) United States Patent  
Saenger Nayver et al.

(10) Patent No.: US 12,625,407 B2  
(45) Date of Patent: May 12, 2026

(54) ELECTRO-OPTIC ASSEMBLY HAVING AN ANTIREFLECTIVE ELECTRODE STACK WITH COVERT CONDUCTION WELLS

(71) Applicant: Gentex Corporation, Zeeland, MI (US)

(72) Inventors: Mario F. Saenger Nayver, Holland, MI (US); David J. Cammenga, Holland, MI (US); Henry A. Luten, Zeeland, MI (US); John S. Anderson, Holland, MI (US)

(73) Assignee: GENTEX CORPORATION, Zeeland, MI (US)

( * ) Notice: Subject to any disclaimer, the term of this patent is extended or adjusted under 35 U.S.C. 154(b) by 338 days.

(21) Appl. No.: 18/545,112

(22) Filed: Dec. 19, 2023

(65) Prior Publication Data

US 2024/0201552 A1 Jun. 20, 2024

Related U.S. Application Data

(60) Provisional application No. 63/433,861, filed on Dec. 20, 2022.

(51) Int. Cl.  
*G02F 1/155* (2006.01)  
*G02F 1/1335* (2006.01)

(52) U.S. Cl.  
CPC ........ *G02F 1/155* (2013.01); *G02F 1/133502* (2013.01); *G02F 2201/38* (2013.01)

(58) Field of Classification Search  
CPC . G02F 1/155; G02F 1/133502; G02F 2201/38  
See application file for complete search history.

(56) References Cited

U.S. PATENT DOCUMENTS

| | | | |
|---|---|---|---|
| 9,091,868 B2 | 7/2015 | Bergh et al. | |
| 2011/0080629 A1* | 4/2011 | Neuman | G02F 1/155 |
| | | | 359/265 |
| 2020/0117069 A1 | 4/2020 | Telfer et al. | |
| 2020/0209621 A1 | 7/2020 | Neuman et al. | |
| 2021/0072609 A1* | 3/2021 | Saenger Nayver | G02F 1/155 |
| 2022/0128880 A1 | 4/2022 | Patterson et al. | |
| 2023/0082112 A1 | 3/2023 | Nayver | |

* cited by examiner

*Primary Examiner* — Phu Vu  
(74) *Attorney, Agent, or Firm* — Price Heneveld LLP; Brian James Brewer

(57) ABSTRACT

An electro-optic assembly includes a front substrate that has a first surface and a second surface opposite the first surface. A second substrate has a third surface and a fourth surface opposite the third surface, the second and third surfaces face each other to define a gap. A first electrode is coupled to the second surface and a second electrode is coupled to the third surface. An electro-optic medium is in the gap. At least one of the first and second electrodes are an antireflective electrode stack including a conductive layer formed of a transparent conductive oxide, an overcoat layer in contact with the electro-optic medium and formed of a substantially transparent conductive material, an insulating layer between the conductive layer and the overcoat layer, and a base layer between the substrate and conductive layer. A conduction well contains the electro-optic medium and extends through the insulating layer.

20 Claims, 12 Drawing Sheets

ELECTRO-OPTIC ASSEMBLY HAVING AN ANTIREFLECTIVE ELECTRODE STACK WITH COVERT CONDUCTION WELLS

CROSS-REFERENCE TO RELATED APPLICATION

This application claims priority to and the benefit under 35 U.S.C. § 119(e) of U.S. Provisional Application No. 63/433,861, filed on Dec. 20, 2022, entitled "ELECTRO-OPTIC ASSEMBLY HAVING AN ANTIREFLECTIVE ELECTRODE STACK WITH COVERT CONDUCTION WELLS," the disclosure of which is hereby incorporated herein by reference in its entirety.

FIELD OF THE DISCLOSURE

The present disclosure generally relates to an electro-optic assembly, and, more particularly, to an electro-optic assembly that includes an antireflective electrode stack defining reflectance and color matched conduction wells that provide electric continuity between layers.

SUMMARY OF THE DISCLOSURE

According to one aspect of the present disclosure, an electro-optic assembly comprises a front substrate that has a first surface and a second surface opposite the first surface. A second substrate has a third surface and a fourth surface opposite the third surface, the second and third surfaces face each other to define a gap. A first electrode is coupled to the second surface and a second electrode is coupled to the third surface. An electro-optic medium is located between the first electrode and the second electrode. At least one of the first and second electrodes are an antireflective electrode stack that includes a conductive layer formed of a transparent conductive oxide, an overcoat layer in contact with the electro-optic medium and formed of a substantially transparent conductive material, an insulating layer between the conductive layer and the overcoat layer, and a base layer between the substrate and conductive layer. A conduction well at least partially contains the electro-optic medium and extends through the insulating layer.

According to another aspect of the present disclosure, an electro-optic assembly comprises a front substrate that has a first surface and a second surface opposite the first surface. A second substrate has a third surface and a fourth surface opposite the third surface, the second and third surfaces face each other to define a gap. A first antireflective electrode stack is coupled to the second surface and a second antireflective electrode stack is coupled to the third surface. An electro-optic medium is located between the first electrode and the second electrode. Each of the first and second antireflective electrode stacks includes a conductive layer formed of a transparent conductive oxide, an overcoat layer in contact with the electro-optic medium and formed of a substantially transparent conductive material, an insulating layer between the conductive layer and the overcoat layer, and a base layer between the substrate and conductive layer. A plurality of conduction wells at least partially contains the electro-optic medium and extends through the insulating layer.

According to yet another aspect of the present disclosure, an electro-optic assembly comprises a front substrate that has a first surface and a second surface opposite the first surface. A second substrate has a third surface and a fourth surface opposite the third surface, the second and third surfaces face each other to define a gap. An antireflective electrode stack is coupled to the second surface or the third surface, the antireflective electrode stack includes a conductive layer formed of a transparent conductive oxide, an overcoat layer in contact with the electro-optic medium and formed of a substantially transparent conductive material, an insulating layer between the conductive layer and the overcoat layer, and a base layer between the substrate and conductive layer. A conduction well at least partially contains the electro-optic medium and extends through the insulating layer.

These and other features, advantages, and objects of the present disclosure will be further understood and appreciated by those skilled in the art by reference to the following specification, claims, and appended drawings.

DETAILED DESCRIPTION

Figure 1:
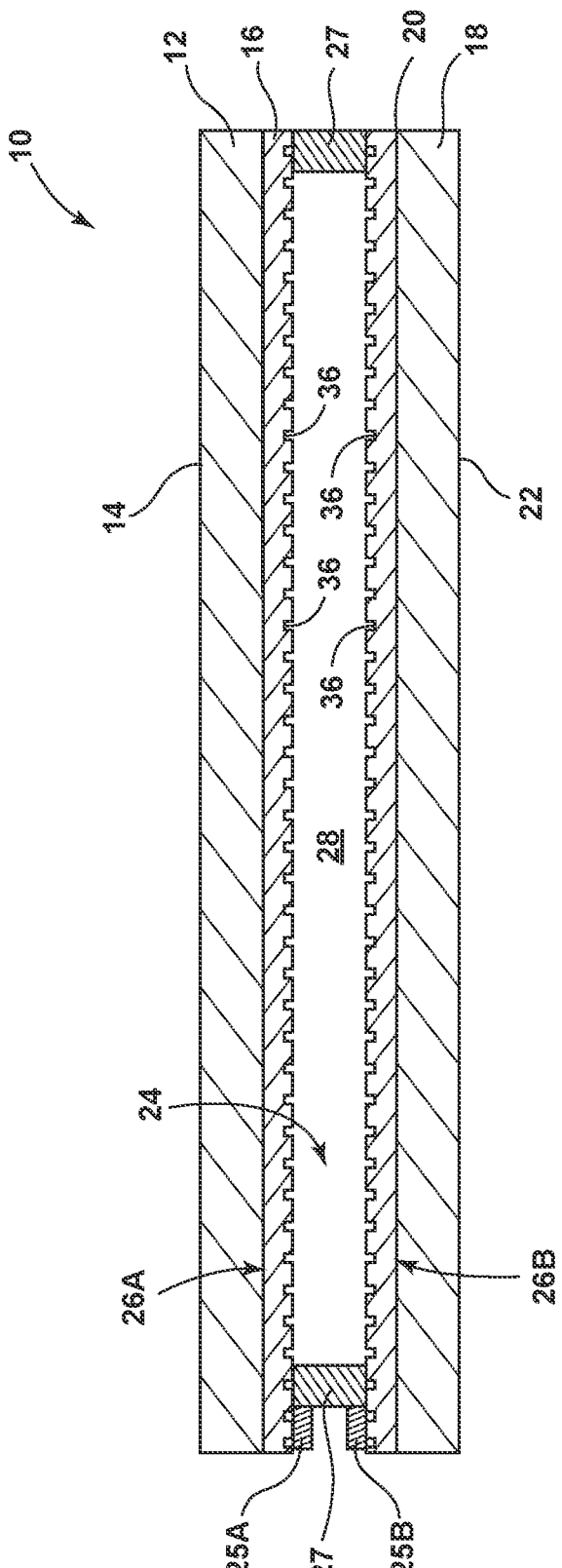
FIG. 1 is a cross-sectional view of an electro-optic assembly that includes a pair of opposing antireflective electrode stacks, each defining conduction wells in accordance with an aspect of the present disclosure.

The present illustrated embodiments reside primarily in combinations of method steps and apparatus components related to an electro-optic assembly that includes an antireflective electrode stack defining reflectance and color matched conduction wells that provide electric continuity between layers. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof, shall relate to the disclosure as oriented in FIG. 1. Unless stated otherwise, the term "front" shall refer to the surface of the device closer to an intended viewer of the device, and the term "rear" shall refer to the surface of the device further from the intended viewer of the device. However, it is to be understood that the disclosure may assume various alternative orientations, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

Referring to FIGS. 1-4, reference numeral 10 generally designates an electro-optic assembly. The electro-optic assembly 10 includes a first substrate 12 that has a first surface 14 and a second surface 16 opposite the first surface 14. A second substrate 18 has a third surface 20 and a fourth surface 22 opposite the third surface 20, the second and third surfaces 16, 20 face each other to define a gap 24. A first antireflective electrode stack 26A is coupled to the second surface 16, and a second antireflective electrode stack 26B is coupled to the third surface 20. An electro-optic medium 28 is located between the first antireflective electrode stack 26A and the second antireflective electrode stack 26B. The first and second antireflective electrode stacks 26A, 26B each include a conductive layer 30 formed of a transparent conductive oxide, an overcoat layer 32 is in contact with the electro-optic medium 28 and formed of a substantially transparent conductive material, and an insulating layer 34 between the conductive layer 30 and the overcoat layer 32. A conduction well 36 that at least partially contains the electro-optic medium 28 extends through the insulating layer 34.

Figure 2A:
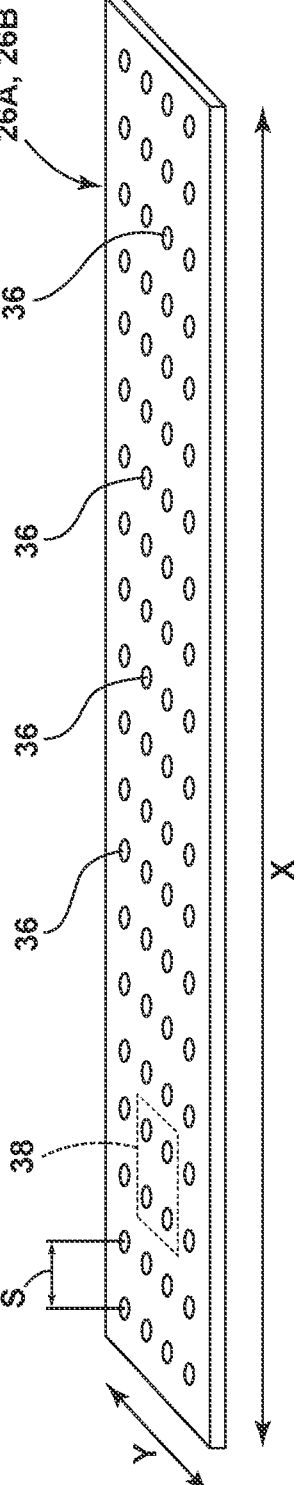
FIG. 2A is an upper perspective view of an antireflective electrode stack that defines conduction wells in accordance with an aspect of the present disclosure.
Figure 2B:
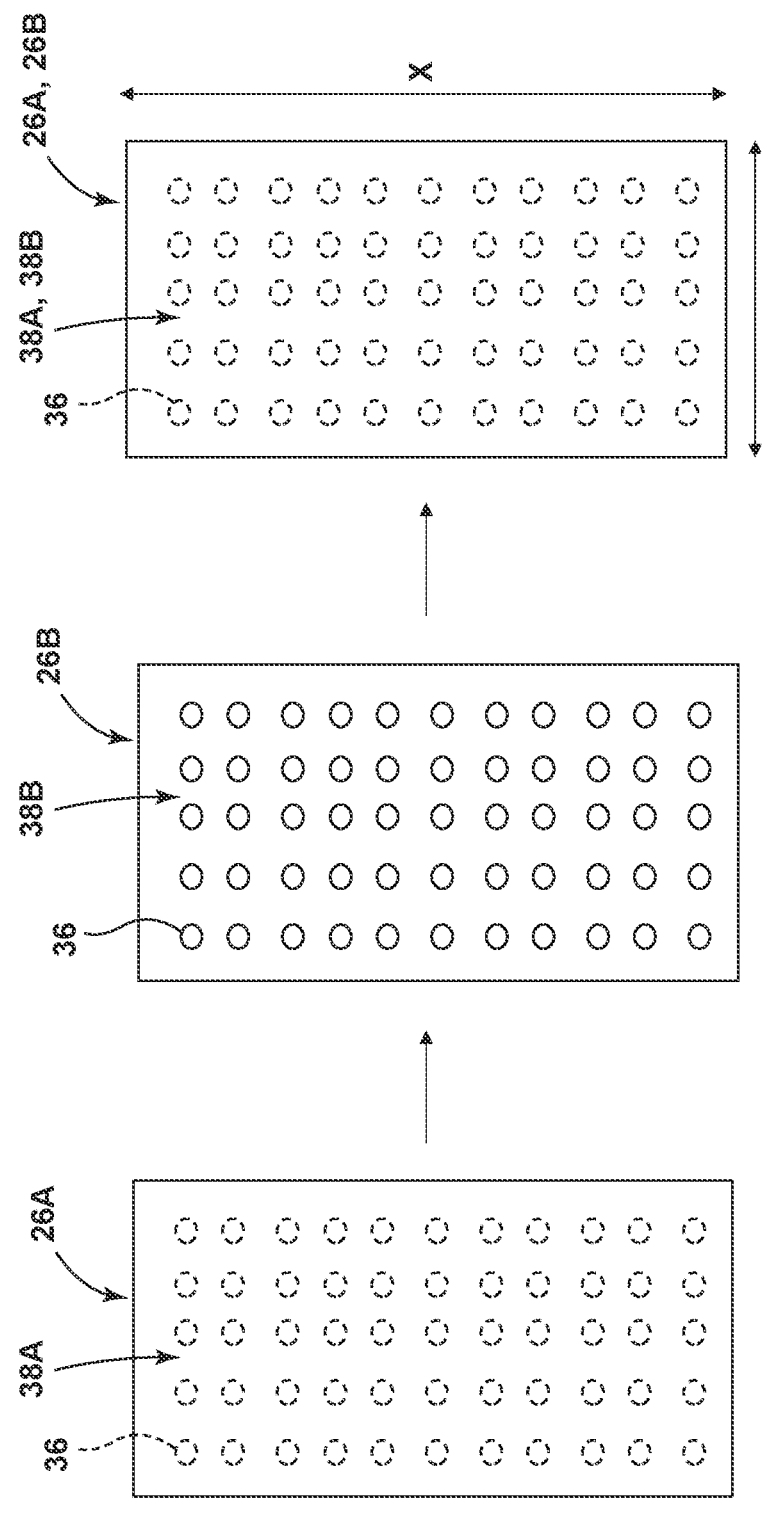
FIG. 2B is a series of top plan views of a first electrode stack that includes a first conduction well pattern and a second electrode stack that includes a second conduction well pattern that is aligned with the first conduction well pattern in accordance with an aspect of the present disclosure.
Figure 2C:
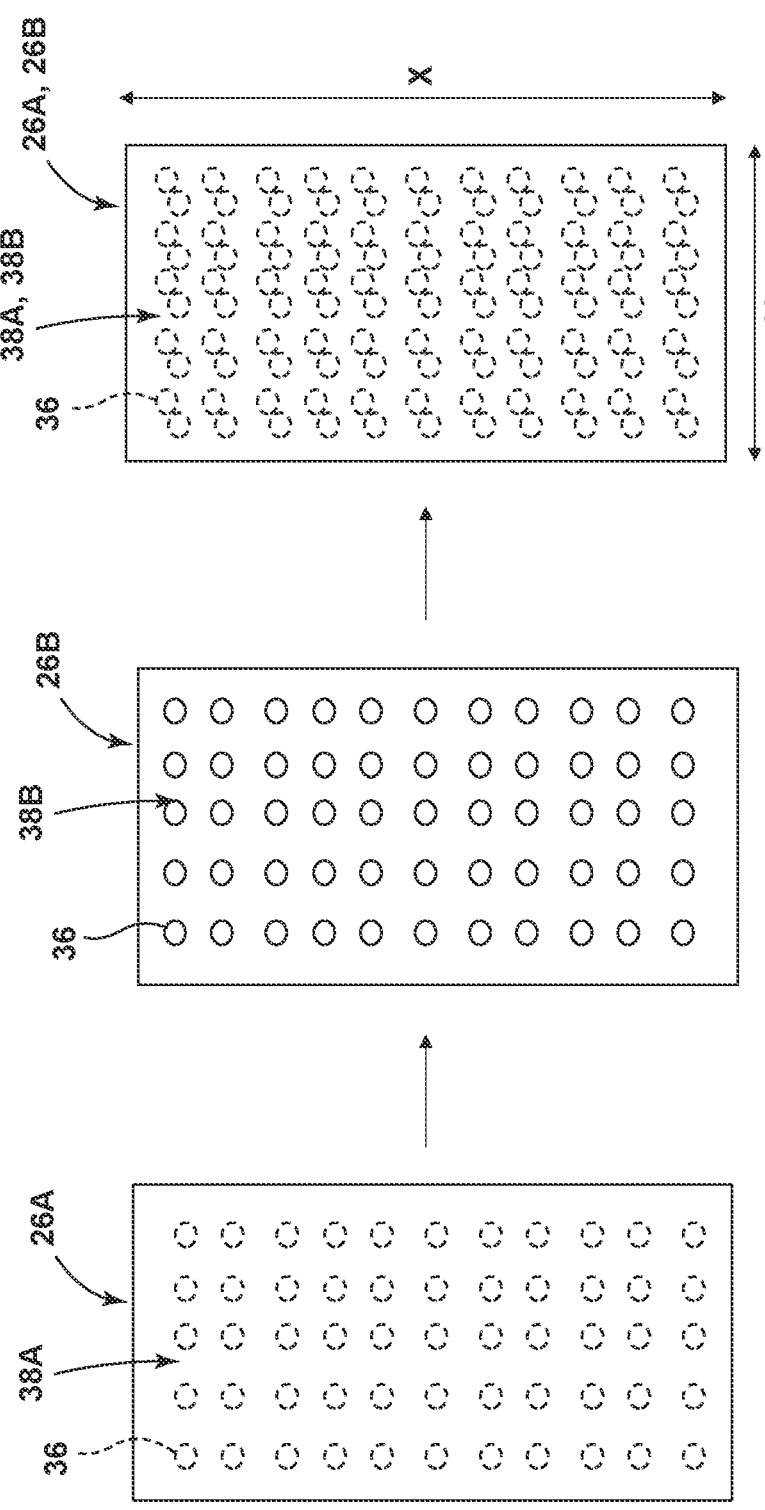
FIG. 2C is a series of top plan views of a first electrode stack that includes a first conduction well pattern and a second electrode stack that includes a second conduction well pattern that is offset from the first conduction well pattern in accordance with an aspect of the present disclosure.

With reference now to FIGS. 2A-2C, the first and second antireflective electrode stacks 26A, 26B may each include a plurality of conduction wells 36. The conduction wells 36 may be located in a variety of different distributions. For example, in FIG. 2A, each conduction well 36 may be spaced by space "S" between adjacent conduction wells 36. For example, the spacing S may be in a vertical or "Y" direction, a horizontal or "X" direction, or a combination of Y and X directions. In some embodiments, the spacing S is different between the X and Y directions. In some embodiments, the spacing S is equal in the X and Y directions. The space S may represent a lattice parameter for a cubic or hexagonal arrangement of the conduction wells 36, or an average distance of non-uniform distribution. The space S may be about 5 mm apart or more, for example, about 4 mm apart or more, about 3 mm apart or more, about 2 mm apart or more, about 1 mm apart or more, about 0.5 mm apart or more, or about 0.2 mm apart or more. The conduction well pattern 38 on the localized area may be repeating. In this manner, the distribution of conduction wells 36 may be uniformly patterned across substantially the entire first and second antireflective electrode stacks 26A, 26B. However, in some embodiments, the distribution of conduction wells 36 may be non-uniformly patterned across substantially the entire first and second antireflective electrode stacks 26A, 26B.

FIG. 2B is from a perspective of a user looking towards the first surface 14 and third surface 20 illustrated in FIG. 1. In some embodiments, the conduction wells 36 on the first antireflective electrode stack 26A may be aligned with the conduction wells 36 on the second antireflective electrode stack 26B. More particularly, the first electrode stack 26A may include a first conduction well pattern 38A and the second electrode stack may include a second conduction well pattern 38B that is aligned with the first conduction well pattern 38A. In this manner, when the electro-optic assembly 10 is assembled as shown in the rightmost image, the conduction wells 36 are aligned along both the X and Y directions. However, an alignment of the conduction wells 36 may result in zones with high reflectance that would not be desirable for obscuring the conduction wells 36 in various implementations.

In some embodiments, the conduction wells 36 on the first antireflective electrode stack 26A may be misaligned with the conduction wells 36 on the second antireflective electrode stack 26B in order to avoid zones with high reflectance. Such an arrangement is shown in FIG. 2C, where the conduction wells 36 on the first antireflective electrode stack 26A are offset from the conduction wells 36 on the second antireflective electrode stack 26B. FIG. 2C is from a perspective of a user looking towards the first surface 14 and third surface 20 illustrated in FIG. 1. More particularly, the first conduction well pattern 38A is offset from the second conduction well pattern 38B. In this manner, when the electro-optic assembly 10 is assembled as shown in the rightmost image, the conduction wells 36 are offset along at least one of the X and Y directions. The offset may be along the X direction, the Y direction, or both the X and Y directions. In some embodiments, the first conduction well pattern 38A is offset from the second conduction well pattern 38B such that conduction wells 36 in the first antireflective electrode stack 26A is aligned centrally and/or substantially centrally in the space S between the conduction wells 36 on the second antireflective electrode stack 26B.

With continued reference to FIGS. 2A-2C, it should be appreciated that, in some embodiments, some conduction wells 36 in the first antireflective electrode stack 26A may be aligned while other conduction wells 36 in the first antire-flective electrode stack 26A may be offset from the conduc-tion wells 36 in the second antireflective electrode stack 26B within the electro-optic assembly 10. Likewise, the number, relative size, and distribution of the conduction wells 36 illustrated in FIGS. 2A-2C are exemplary in nature and should not be construed as limiting. Further, it should be appreciated that one of the first and second antireflective electrode stacks 26A, 26B may be a single layer electrode (not shown) comprising, for example, electrically conduc-tive transparent materials, including, but not limited to, a transparent metal oxide (e.g., indium tin oxide, F:SnO2, ZnO, IZO), IMI Structures, carbon (graphene and/or graph-ite) and/or a conductive metal mesh (e.g., nanowires).

Figure 6:
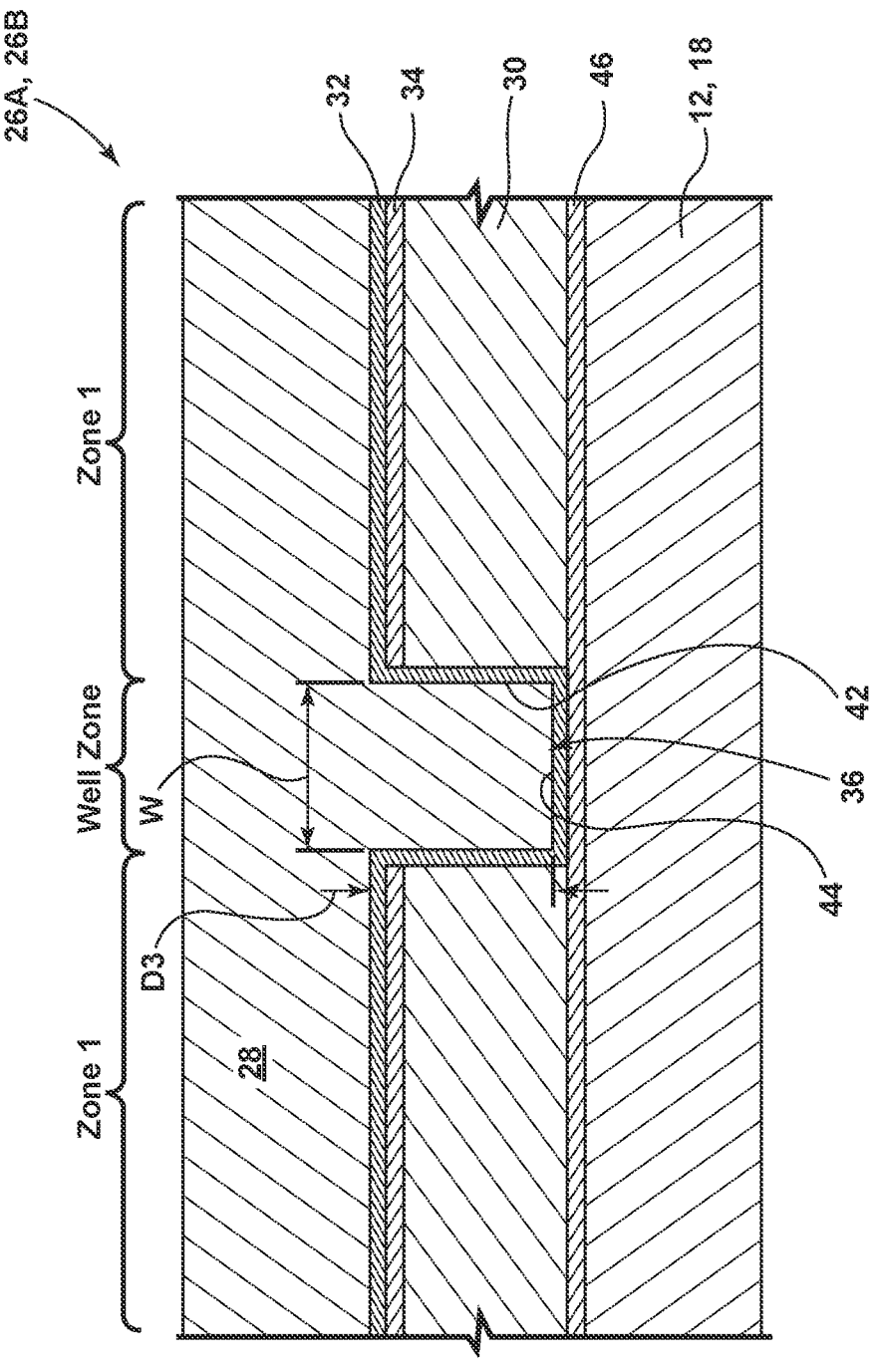
FIG. 6 is an enlarged cross-sectional view of an antireflective electrode stack with a conduction well of a first construction and a third depth in accordance with an aspect of the present disclosure.

With reference now to FIGS. 1-4, the distribution, width "W," and depth "D" of the conduction well 36 can vary based on end-use applications. The first and second elec-trode stacks 26A, 26B have anti-reflective properties based on the layer materials and layer organization contained in each electrode stack 26A, 26B. The conduction wells 36 provide electrical continuity between the conductive layer and the electro-optic medium 28. Without conductive wells 36, the electron transfer from the conductive layer 30 would be hindered by the insulating layer 34, and the overcoat layer 32 functions as an electric current spreading layer for the electrical current flowing between the conduction wells 36 into the overcoat layer 32 and the electro-optic medium 28. However, the reflectance and reflected color of the conduc-tion wells 36 can be significantly different than the surround-ing area, therefore making the conduction wells 36 more noticeable. The concealment properties of the wells are increased by minimizing the width W, increasing the sepa-ration S, and by adjusting the coating stack within the conduction wells 36 zone (e.g., patterned zone or well zone) in order to match the low reflectance and color of the surrounding areas. In some embodiments, the width W of each conduction well 36 may be about 500 am or less, for example, about 100 am or less, about 80 am or less, about 60 am or less, about 40 am or less, about 10 am or less, or between about 10 am and about 100 μm. In some embodi-ments, the depth D of the conduction well 36 may be equal to the thickness of the insulating layer 34 and the conductive layer 30 as shown in FIG. 6. The electro-optic medium 28 may be retained within the gap 24 via a seal 27 that extends along a perimeter of the electro-optic assembly 10 (FIG. 1). A first electrical bus 25A may be connected to the first antireflective electrode stacks 26A and a second electrical bus 25B may be connected to the second antireflective electrode stacks 26B (FIG. 1). More particularly, the elec-trical buses 25A, 25B may provide current to the antireflec-tive electrode stacks 26A, 26B (e.g., via the overcoat layer 32).

Figures 3A, 3B, 3C, 3D:
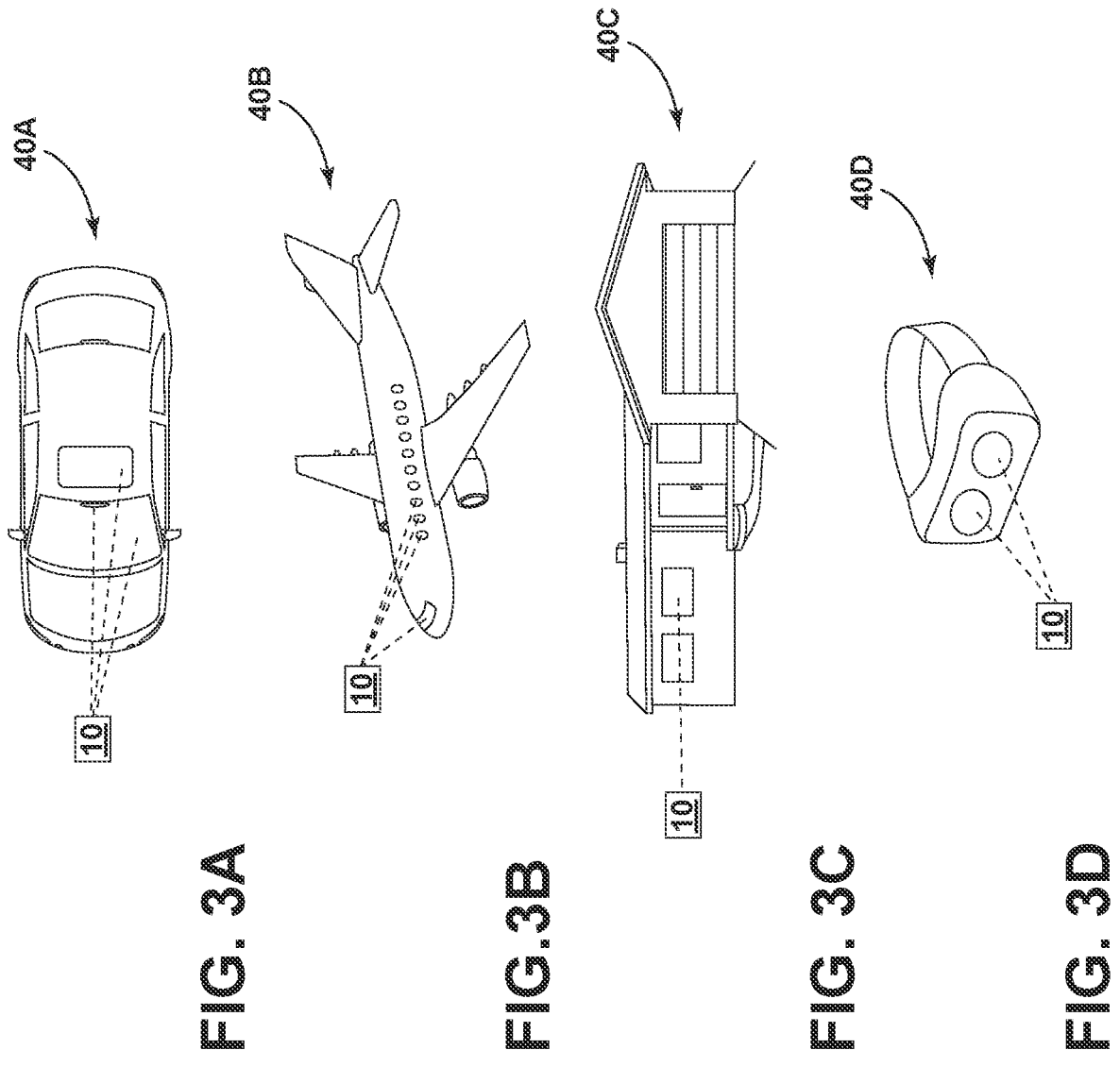
FIG. 3A is a top view of a vehicle incorporating an electro-optic assembly in accordance with an aspect of the present disclosure.
FIG. 3B is an upper perspective view of an aircraft incorporating an electro-optic assembly in accordance with an aspect of the present disclosure.
FIG. 3C is an elevational view of a building incorporating an electro-optic assembly in accordance with an aspect of the present disclosure.
FIG. 3D is an upper perspective view of an eyewear assembly incorporating an electro-optic assembly in accordance with an aspect of the present disclosure.

Referring to FIGS. 3A-3D, the electro-optic assembly 10 may be configured as an electro-chromic device that is switchable between a substantially transmissive state and a substantially darkened state. In other embodiments, the electro-optic assembly 10 is configured as an electro-chro-mic device that is switchable between a high reflectance state and a low reflectance state. Various embodiments of electro-optic assembly 10 may be incorporated with one or more structures 40A-40C. For example, FIG. 3A illustrates an automobile 40A employing the electro-optic assembly 10, for example, with an interior rearview mirror, a sunroof, a windshield, a side window, a heads-up display, and/or other interior vehicle locations that display one or more aspects of the electro-optic assembly 10. The automobile 40A may include a commercial vehicle, an emergency vehicle, a residential vehicle, or the like. FIG. 3B illustrates an aircraft 40B employing the electro-optic assembly 10 (e.g., a front window, side window, heads-up display). FIG. 3C illustrates a building 40C employing electro-optic assem-bly 10 (e.g., a window). The building 40C may be a residential building, a commercial building, and/or the like. Generally speaking, the electro-optic assembly 10 may be incorporated into any environment where it is beneficial to change the state of a window, mirror, and/or display. FIG. 3D illustrates eyewear 40D employing electro-optic assem-bly 10. For example, the eyewear 40D may be glass or plastic with dimming functionality and include augmented reality or virtual reality. Generally speaking, other struc-tures, such as a heads-up display or other environments wherein electro-chromic effects are beneficial and may employ the electro-optic assembly 10 with dimming func-tionality or augmented reality. Generally speaking, other structures, such as a heads-up display or other environments wherein a light dimming device with low reflectance is beneficial and may employ the electro-optic assembly 10.

Figure 4:
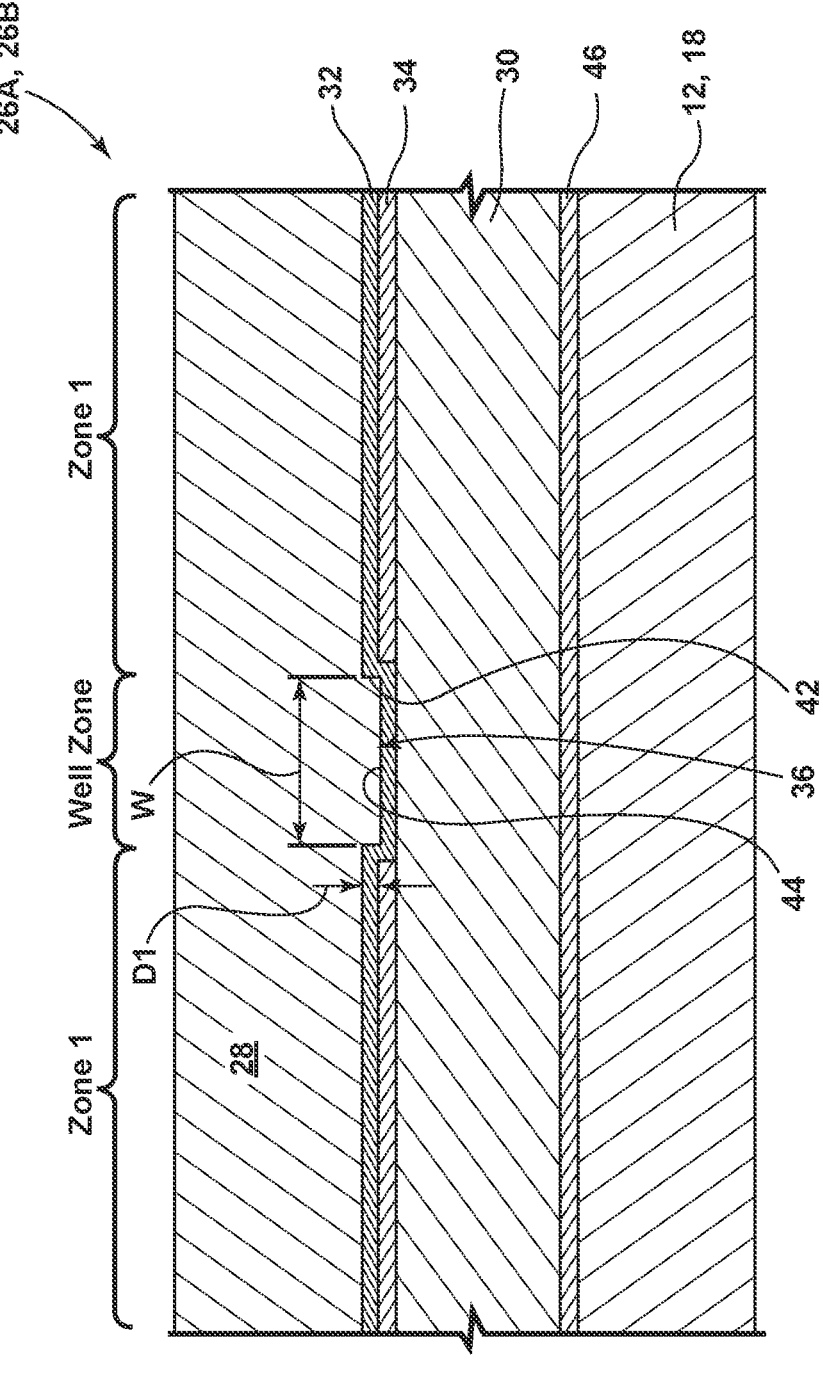
FIG. 4 is an enlarged cross-sectional view of an antireflective electrode stack with a conduction well of a first construction and a first depth in accordance with an aspect of the present disclosure.
Figure 5:
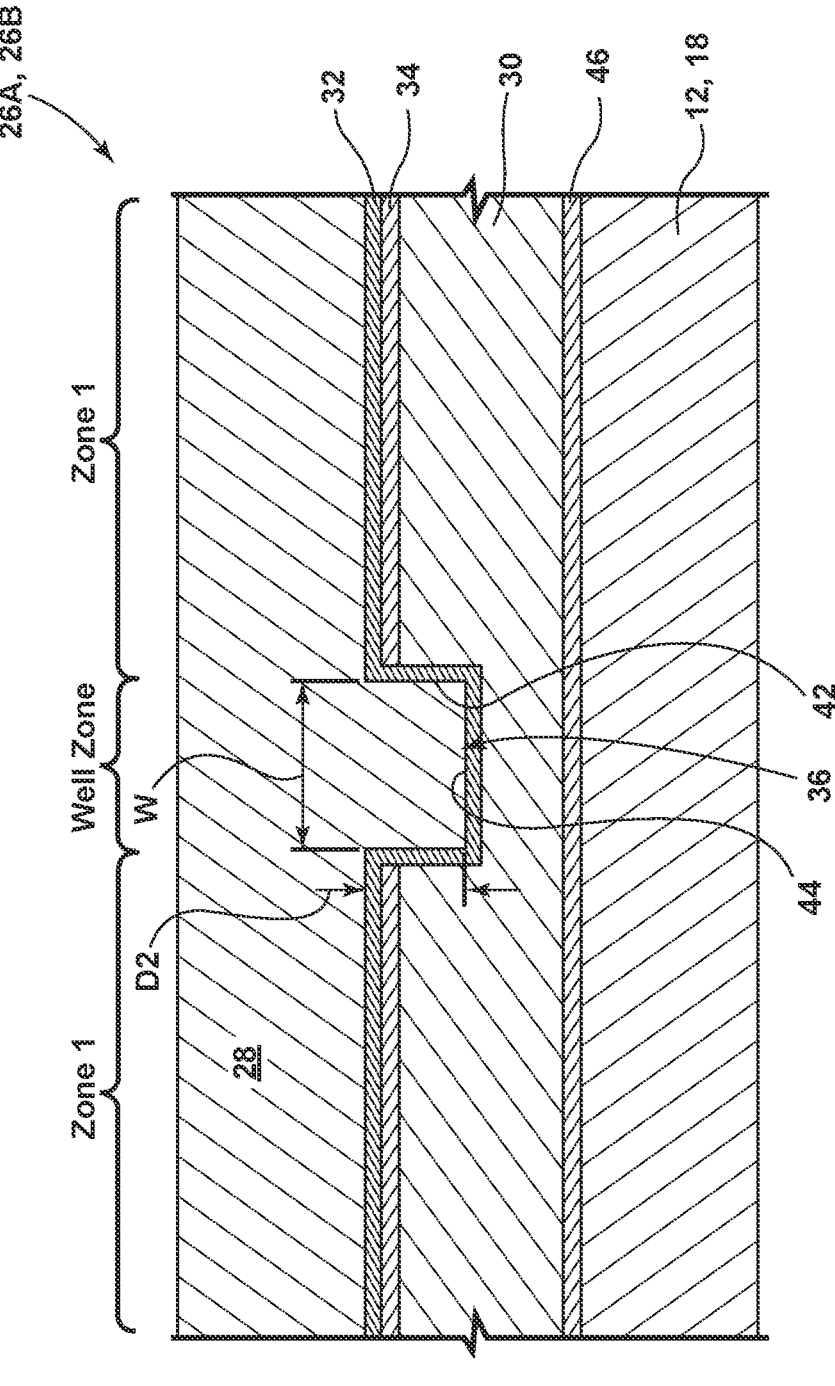
FIG. 5 is an enlarged cross-sectional view of an antireflective electrode stack with a conduction well of a first construction and a second depth in accordance with an aspect of the present disclosure.

With reference now to FIGS. 4-6, the conduction well 36 is at least partially covered by the overcoat layer 32. In this manner, at least part of the overcoat layer 32 may be directly in contact with the electro-optic medium 28 within the conduction well 36. More particularly, the conduction well 36 is defined by a well sidewall 42 and a well floor 44. The well sidewall 42 may be entirely formed and integral with the overcoat layer 32. In some embodiments, the well floor 44 may also be entirely formed and integral with the overcoat layer 32. For example, in some embodiments, the overcoat layer 32 may be deposited on the antireflective electrode stacks 26A, 26B after forming the conduction wells 36 and provide electrical continuity between the conducting layer 30 and the overcoat layer 32. The antire-flective electrode stacks 26A, 26B may further include a base layer 46 coupled to (e.g., directly connected to) the first and second substrates 12, 18.

With reference particularly to FIG. 4, the conduction well 36 includes a first depth "D1." In the first depth D1, the conduction well 36 extends through the insulating layer 34 only. The well sidewall 42 and a well floor 44 may be covered by the overcoat layer 32. In this manner, the overcoat layer 32 that covers the well floor 44 may be substantially aligned with the insulating layer 34. In some embodiments, the well floor 44 may include a rough or porous surface to further reduce reflectance. The roughness of the well floor 44 being greater than a roughness of regions of the overcoat layer 32 surrounding the conduction well 36.

With reference now to FIG. 5, the conduction well 36 includes a second depth "D2." In the second depth D2, the conduction well 36 extends through the insulating layer 34 and at least part of the conductive layer 30. The well sidewall 42 and a well floor 44 may be covered by the overcoat layer 32. In this manner, the overcoat layer 32 that covers the well floor 44 may be substantially aligned with the conductive layer 30 and the overcoat layer 32 may directly interface with the conductive layer 30 within the conduction well 36. In some embodiments, the well floor 44 may include a rough or porous surface to further reduce reflectance and increase the interface area between the conduction well 36 and the electro-optic medium 28. The second depth D2 may be about 95% or less a thickness of the conductive layer 30, for example, about 85% or less, about 75% or less, about 50% or less, about 30% or less, about 10% or less, about 5% or less, or between about 40% and about 60%.

With reference now to FIG. 6, the conduction well 36 includes a third depth "D3." In the third depth D3, the conduction well 36 extends through the insulating layer 34 and the conductive layer 30. The well sidewall 42 and a well floor 44 may be covered by the overcoat layer 32. In this manner, the overcoat layer 32 covering the well floor 44 may be in direct contact with the base layer 46 within the conduction well 36. In some embodiments, the well floor 44 may include a rough or porous surface to further reduce reflectance and increase the interface area between the conduction well 36 and the electro-optic medium 28. As the depth increases, the coating stack within the conduction well 36 comprises the base layer 46 and the overcoat layer 32 may produce a reflectance spectrum with a color mismatch dE less than about 5 units, or less than about 2 units, and a reflectance mismatch of less than 2% with respect to the color in a non-patterned area or "zone 1." In some embodiments, the conduction well 36 includes one or more conduction wells 36 that provide electrical continuity between the overcoat layer 32 and the conductive layer 30 such that the conduction well 36 has a reflectance and color difference with respect to the surrounding area less than 5 units, therefore having a stealthy appearance.

Figure 7:
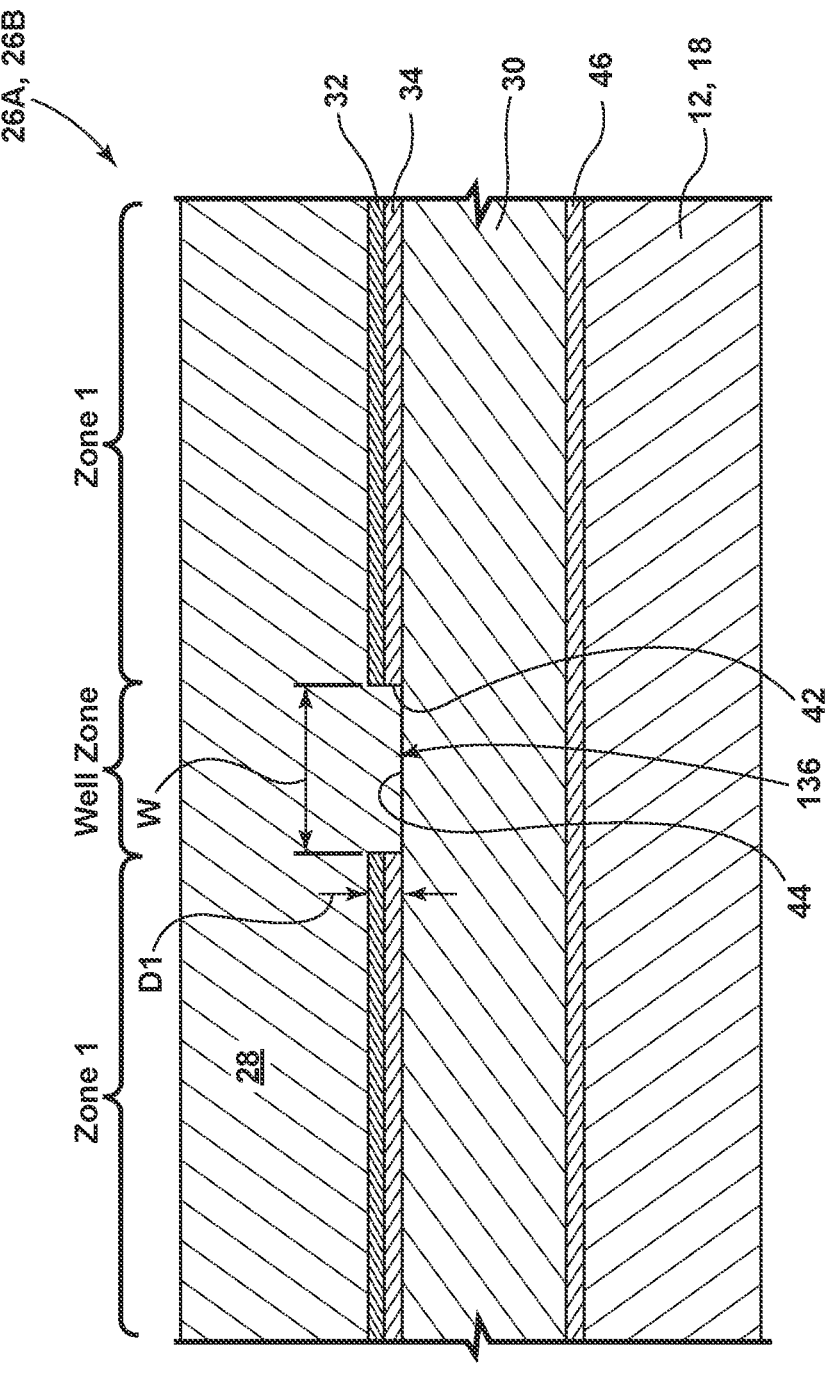
FIG. 7 is an enlarged cross-sectional view of an antireflective electrode stack with a conduction well of a second construction and a first depth in accordance with an aspect of the present disclosure.
Figure 8:
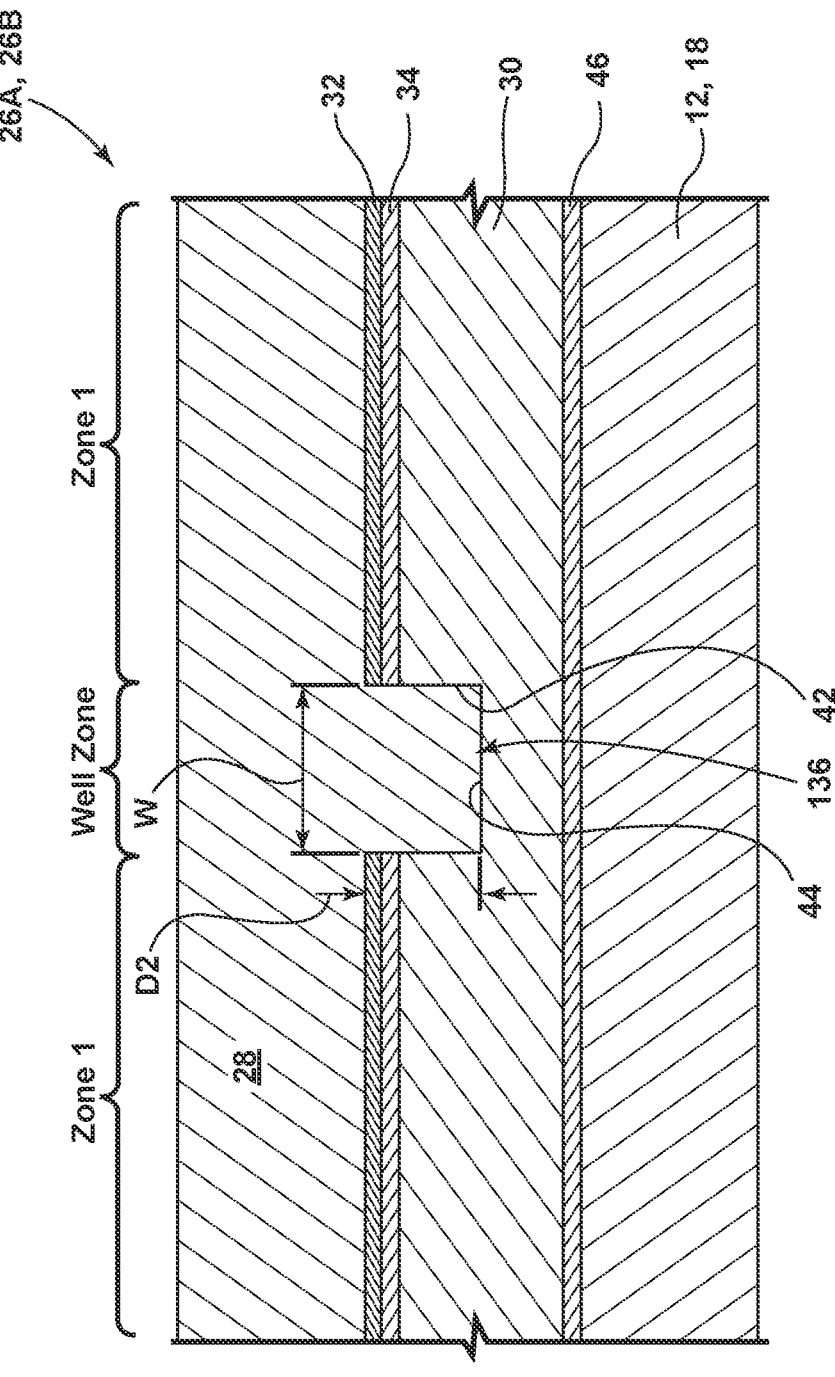
FIG. 8 is an enlarged cross-sectional view of an antireflective electrode stack with a conduction well of a second construction and a second depth in accordance with an aspect of the present disclosure.
Figure 9:
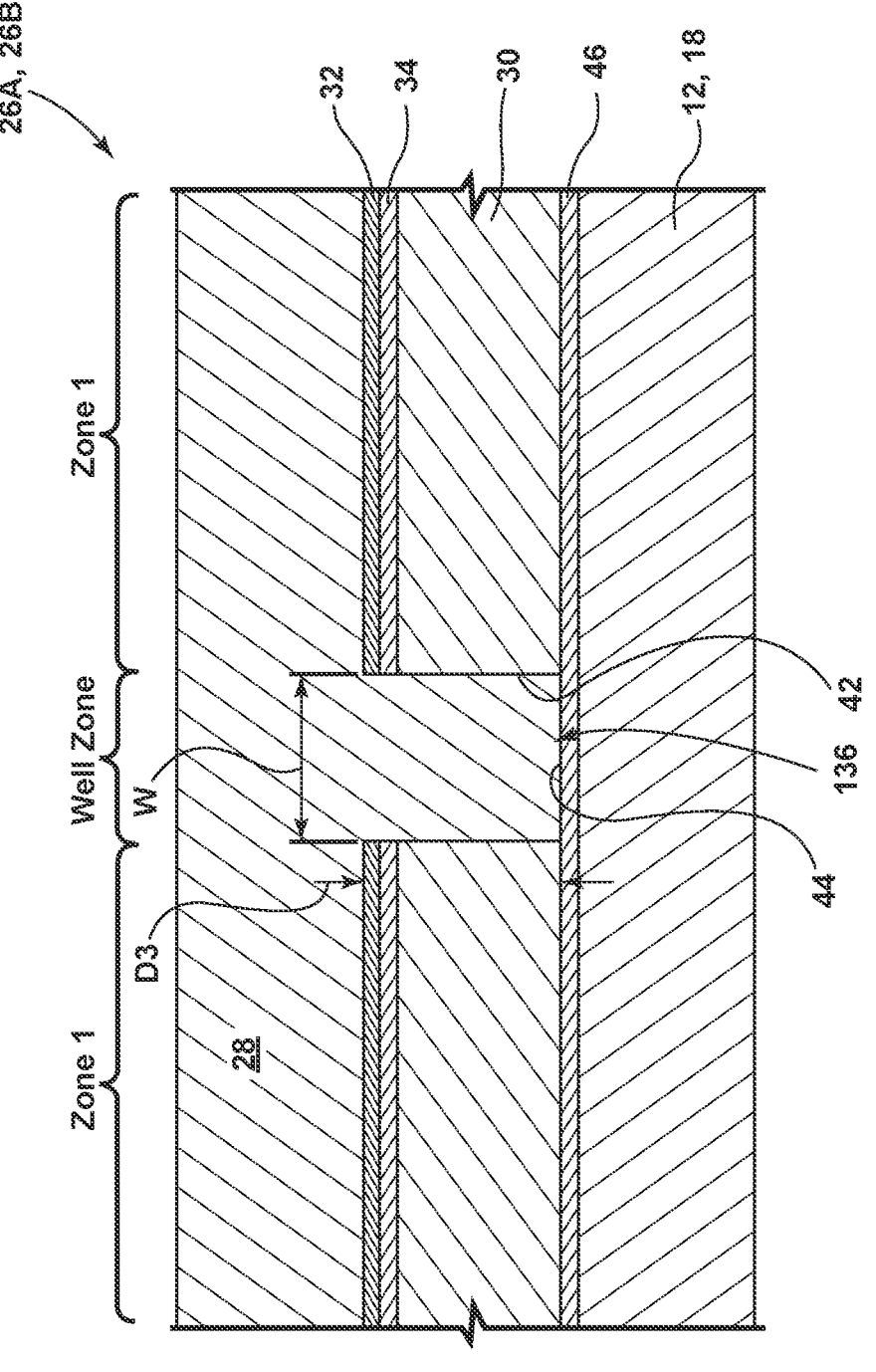
FIG. 9 is an enlarged cross-sectional view of an antireflective electrode stack with a conduction well of a second construction and a third depth in accordance with an aspect of the present disclosure.

With reference to FIGS. 7-9, the conduction well 136 of a second construction is illustrated. In the second construction, the conduction well 136 includes a well sidewall 42 and a well floor 44 that is not covered by the overcoat layer 32. In this manner, the well sidewall 42 is not coated by the overcoat layer 32 and, instead, is defined by the subsequent layers. As such, depending on the depth, the electro-optic medium 28 within the conduction well 136 may contact at least the insulating layer 34 and the conductive layer 30. Accordingly, during assembly, the overcoat layer 32 may be deposited on the insulating layer 34 prior to forming the conduction well 136. It should be appreciated that both the first and second constructions of the conduction well 36, 136 may be incorporated into any of the above described structures 40A-40C (FIGS. 2A-2D). The overcoat layer 32 electrically connects to the conduction layer 30 in the conduction well 136 with the electro-optic medium 28.

With reference to FIG. 7, the conduction well 136 of the second construction includes the first depth "D1." In the first depth D1, the conduction well 136 extends through the overcoat layer 32 and the insulating layer 34 only. As such, the well sidewall 42 may be defined by the overcoat layer 32 and the insulating layer 34, and the well floor 44 is defined by the conductive layer 30. In some embodiments, the well floor 44 may include a rough or porous surface to further reduce reflectance and increase the interface area between the conduction well 136 and the electro-optic medium 28.

With reference now to FIG. 8, the conduction well 136 of the second construction includes a second depth "D2." In the second depth D2, the conduction well 136 extends through the insulating layer 34 and at least part of the conductive layer 30. In this manner, the well sidewall 42 may be defined by the overcoat layer 32, the insulating layer 34, and the conductive layer 30, and the well floor 44 is defined by the conductive layer 30. In some embodiments, the well floor 44 may include a rough or porous surface to further reduce reflectance and increase the interface area between the conduction well 136 and the electro-optic medium 28. The second depth D2 may be about 95% or less a thickness of the conductive layer 30, for example, about 85% or less, about 75% or less, about 50% or less, about 30% or less, about 10% or less, about 5% or less, or between about 40% and about 60%.

With reference now to FIG. 9, the conduction well 136 of the second construction includes a third depth "D3." In the third depth D3, the conduction well 136 extends through the insulating layer 34 and the conductive layer 30. As such, the well sidewall 42 may be defined by the overcoat layer 32, the insulating layer 34, and the conductive layer 30, and the well floor 44 is defined by the base layer 46. However, in some embodiments, the electro-optic assembly 10 may not include the base layer 46. In such embodiments, the well floor 44 may be defined by the substrates 12, 18 or a different layer. In some embodiments, the well floor 44 may include a rough or porous surface to further reduce reflectance and increase the interface area between the conduction well 136 and the electro-optic medium 28. As the depth increases, the coating stack within the conduction well 36 comprises the base layer 46 and the overcoat layer 32 may produce a reflectance spectrum with a color mismatch dE less than about 5 units, or less than about 2 units, and a reflectance mismatch of less than 2% with respect to the color in Zone 1.

Figure 10:
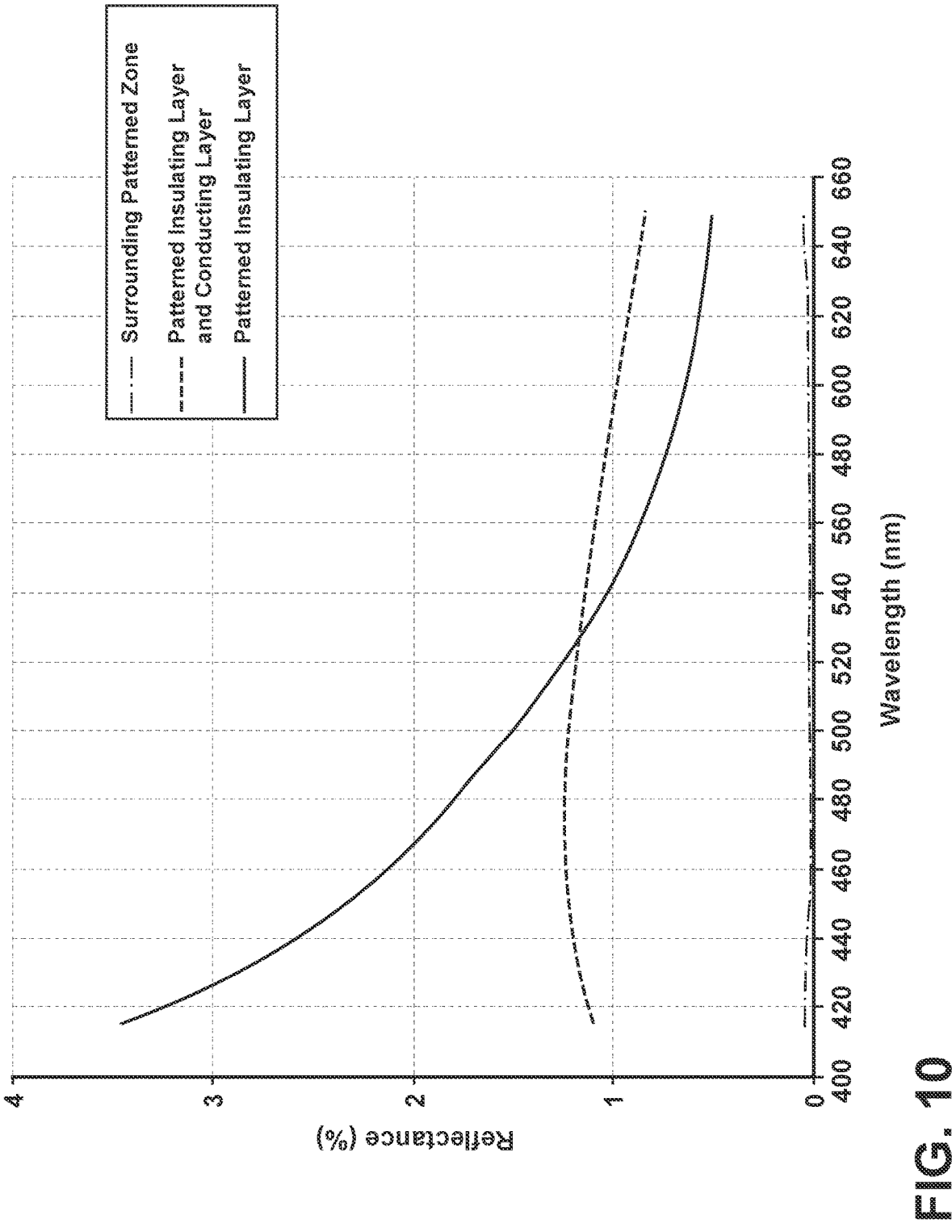
FIG. 10 graphically represents a reflectance spectra within a patterned zone and an area surrounding the patterned zone.

With reference now to FIG. 7, color and reflectance data is provided within a patterned zone and an area surrounding the patterned zone. The area surrounding the patterned zone is the antireflective electrode stacks 26A, 26B, the patterned insulating layer 34 and conductive layer 30 illustrates the reflectance of the conduction well 36 corresponding to the construction in FIG. 6, and the patterned insulating layer 34 illustrates the reflectance of the conduction well 36 corresponding to the construction in FIG. 4. Table 1 below provides the eye weighted reflectance Yr, the reflected color and the difference in reflected color saturation ΔC*between the conduction well 36 and the area surrounding the patterned zone with the examples provided in FIG. 10.

TABLE 1

| Zone | Stack | Yr | a*r | b*r | ΔC |
|------|-------|-----|------|------|-----|
| Area Surrounding Patterned Zone | Substrate/Base Layer/ITO (conductive layer)/SiO2/ITO (overcoat layer)/EO Medium | 0.02 | 0.16 | −0.06 | NA |
| Patterned Insulating Layer and Conducting Layer | Substrate/Base Layer/ITO (conductive layer)/EO Medium | 1.1 | −2.04 | −1.4 | 2.6 |
| Patterned Insulating Layer | Substrate/Base Layer/ITO (conductive layer)/ITO (overcoat layer)/EO Medium | 1.05 | 0.66 | −14.05 | 14 |

With reference now to FIGS. 1-10, the various layers in the antireflective electrode stacks 26A, 26B (and the configuration of the conduction wells 36, 136) may be selected to more closely match the reflectance between the antireflective electrode stacks 26A, 26B and the first and second substrates 12, 18. For example, the conduction layer 30 and the overcoat layer 32 may each be formed of a transparent conductive oxide (TCO), for example, an indium tin oxide (ITO), fluorine-doped tin oxide (F:SnO2), doped zinc oxide, indium zinc oxide (IZO), and/or the like. The insulating layer 34 may be formed of a low index insulating material, for example, silicone dioxide (SiO2), magnesium fluoride (MgF2), and/or the like. The base layer 46 may be formed of a combination of high and low refractive index materials, for example, a mixture of silicone oxide and niobium oxide, and/or a layer of niobium oxide in contact with the first and second substrates 12, 18 and a layer of silicone oxide connected to the layer of niobium oxide. The base layer 46 may function as an index matching layer between the conductive layer 30 and the first and second substrates 12, 18 to decrease the overall reflectance at a substrate-to-conductive layer interface of the electro-optic assembly 10 and, more particularly, the second and third surfaces 16, 20. In some embodiments, a thickness of the overcoat layer 32 is substantially less than a thickness of the conductive layer 30. For example, the overcoat layer 32 may be less than about 50 nm, for example, less than about 20 nm, about 17 nm, about 10 nm or more, or about 5 nm or more. The thickness of the conductive layer 30 may be larger than the thickness of the overcoat layer 32, for example, about 145 nm (e.g., in the case of ITO) but thicker or thinner than this is possible, up to about 3000 nm.

FIGS. 4-9 also illustrate "well zones" corresponding to locations of the conduction wells 36, 136 inside the non-patterned area zone 1. The conduction wells 36, 136 may be formed via a complete or partial patterning comprising insulating layer 34 and conduction layer 30. Such a patterning process could involve known patterning methods like, laser ablation, photolithography, masking, lift-off, reactive ion etching, ion beam etching, etc. The removal process could be done prior to deposition of the overcoat layer 32 (FIGS. 4-6) or after deposition of the overcoat layer 32 (FIGS. 7-9). In some embodiments, the difference in reflectance between the stack within the conducting well 36 (e.g., the well zone) and the stack surrounding the conducting well 36 (e.g., zone 1) is less than 2% in the visible spectral range, and the difference in reflected color $\Delta C^*$ is less than 5, for example, less than 3.

The disclosure is further summarized in the following paragraphs and is further characterized by combinations of any and all of the various aspects described therein.

According to one aspect of the present disclosure, an electro-optic assembly comprises a front substrate that has a first surface and a second surface opposite the first surface. A second substrate has a third surface and a fourth surface opposite the third surface, the second and third surfaces face each other to define a gap. A first electrode is coupled to the second surface and a second electrode is coupled to the third surface. An electro-optic medium is located between the first electrode and the second electrode. At least one of the first and second electrodes are an antireflective electrode stack that includes a conductive layer formed of a transparent conductive oxide, an overcoat layer in contact with the electro-optic medium and formed of a substantially transparent conductive material, an insulating layer between the conductive layer and the overcoat layer, and a base layer between the substrate and conductive layer. A conduction well at least partially contains the electro-optic medium and extends through the insulating layer.

According to another aspect, a conduction well is at least partially defined by a well sidewall that is entirely formed by and integral with an overcoat layer.

According to yet another aspect, a well sidewall extends partially into a conductive layer.

According to still another aspect, a well sidewall extends entirely through a conductive layer.

According to another aspect, a conduction well is further defined by a well floor formed by and integral with an overcoat layer.

According to yet another aspect, a well floor defines a roughness greater than an insulating layer adjacent to a conduction well.

According to still another aspect, a conduction well is at least partially defined by a well sidewall formed by an overcoat layer and an insulating layer.

According to another aspect, a conduction well is further formed by a conductive layer.

According to yet another aspect, an antireflective electrode stack further includes a base layer connected to a conductive layer opposite an insulating layer.

According to still another aspect, a conduction well extends through an insulating layer, a conductive layer, and terminates at a base layer.

According to yet another aspect, first and second electrodes are an antireflective electrode stack.

According to still another aspect, a conduction well on a first electrode stack is misaligned with a conduction well on a second antireflective electrode stack.

According to another aspect of the present disclosure, an electro-optic assembly comprises a front substrate that has a first surface and a second surface opposite the first surface. A second substrate has a third surface and a fourth surface opposite the third surface, the second and third surfaces face each other to define a gap. A first antireflective electrode stack is coupled to the second surface and a second antireflective electrode stack is coupled to the third surface. An electro-optic medium is located between the first electrode and the second electrode. Each of the first and second antireflective electrode stacks includes a conductive layer formed of a transparent conductive oxide, an overcoat layer in contact with the electro-optic medium and formed of a substantially transparent conductive material, an insulating layer between the conductive layer and the overcoat layer, and a base layer between the substrate and conductive layer. A plurality of conduction wells at least partially contains the electro-optic medium and extends through the insulating layer.

According to another aspect, conduction wells on a first antireflective electrode stack are aligned with conduction wells on a second antireflective electrode stack.

According to yet another aspect, conduction wells on a first antireflective electrode stack are offset from conduction wells on a second antireflective electrode stack.

According to still yet another aspect, conduction wells on a first antireflective electrode stack are spaced by a space and conduction wells on a second antireflective electrode stack are aligned substantially centrally in the space.

According to yet another aspect of the present disclosure, an electro-optic assembly comprises a front substrate that has a first surface and a second surface opposite the first surface. A second substrate has a third surface and a fourth surface opposite the third surface, the second and third surfaces face each other to define a gap. An antireflective electrode stack is coupled to the second surface or the third surface, the antireflective electrode stack includes a conductive layer formed of a transparent conductive oxide, an overcoat layer in contact with the electro-optic medium and formed of a substantially transparent conductive material, an insulating layer between the conductive layer and the overcoat layer, and a base layer between the substrate and conductive layer. A conduction well at least partially contains the electro-optic medium and extends through the insulating layer.

According to another aspect, a conduction well includes a plurality of conduction wells that cover less than 1% of an antireflective electrode stack.

According to yet another aspect, an antireflective electrode stack has an eye weighted reflectance in the visible spectral range lower than 2% and a reflected color saturation C* less than 5.

According to still yet another aspect, the overcoat layer has a thickness between 5 nm and 50 nm.

According to still another aspect of the present disclosure, an antireflective electrode stack where the difference in reflectance between the well area and the surrounding area is less than 2% in eye weighted reflectance Yr, and a reflected color saturation ΔC* less than 10, preferably less than 5.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connectors or other elements of the system may be varied, and the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. An electro-optic assembly, comprising:
   a front substrate having a first surface and a second surface opposite the first surface;
   a second substrate having a third surface and a fourth surface opposite the third surface, the second and third surfaces facing each other to define a gap;
   a first electrode coupled to the second surface;
   a second electrode coupled to the third surface;
   an electro-optic medium located between the first electrode and the second electrode; and
   at least one of the first and second electrodes being an antireflective electrode stack comprising:
      a conductive layer formed of a transparent conductive oxide;
      an overcoat layer in contact with the electro-optic medium and formed of a substantially transparent conductive material;
      an insulating layer between the conductive layer and the overcoat layer; and
      a conduction well at least partially containing the electro-optic medium and extending through the insulating layer.

2. The electro-optic assembly of claim 1, wherein the conduction well is at least partially defined by a well sidewall entirely formed by and integral with the overcoat layer.

3. The electro-optic assembly of claim 2, wherein the well sidewall extends partially into the conductive layer.

4. The electro-optic assembly of claim 2, wherein the well sidewall extends entirely through the conductive layer.

5. The electro-optic assembly of claim 2, wherein the conduction well is further defined by a well floor formed by and integral with the overcoat layer.

6. The electro-optic assembly of claim 5, wherein the well floor defines a roughness greater than the insulating layer adjacent to the conduction well.

7. The electro-optic assembly of claim 1, wherein the conduction well is at least partially defined by a well sidewall formed by the overcoat layer and the insulating layer.

8. The electro-optic assembly of claim 7, wherein the conduction well is further formed by the conductive layer.

9. The electro-optic assembly of claim 1, wherein the antireflective electrode stack further includes a base layer connected to the conductive layer opposite the insulating layer.

10. The electro-optic assembly of claim 9, wherein the conduction well extends through the insulating layer, the conductive layer, and terminates at the base layer.

11. The electro-optic assembly of claim 1, wherein the first and second electrodes are each an antireflective electrode stack.

12. The electro-optic assembly of claim 11, wherein the conduction well on the first electrode stack is misaligned with the conduction well on the second antireflective electrode stack.

13. An electro-optic assembly, comprising:
a front substrate having a first surface and a second surface opposite the first surface;
a second substrate having a third surface and a fourth surface opposite the third surface, the second and third surfaces facing each other to define a gap;
a first antireflective electrode stack coupled to the second surface;
a second antireflective electrode stack coupled to the third surface;
an electro-optic medium located between the first antireflective electrode stack and the second antireflective electrode stack; and
each of the first and second antireflective electrode stacks comprising:
a conductive layer formed of a transparent conductive oxide;
an overcoat layer in contact with the electro-optic medium and formed of a substantially transparent conductive material;

an insulating layer between the conductive layer and the overcoat layer; and
a plurality of conduction wells at least partially containing the electro-optic medium and extending through the insulating layer.

14. The electro-optic assembly of claim 13, wherein the conduction wells on the first antireflective electrode stack are aligned with the conduction wells on the second antireflective electrode stack.

15. The electro-optic assembly of claim 13, wherein the conduction wells on the first antireflective electrode stack are offset from the conduction wells on the second antireflective electrode stack.

16. The electro-optic assembly of claim 15, wherein the conduction wells on the first antireflective electrode stack are spaced by a space and the conduction wells on the second antireflective electrode stack are aligned substantially centrally in the space.

17. An electro-optic assembly, comprising:
a front substrate having a first surface and a second surface opposite the first surface;
a second substrate having a third surface and a fourth surface opposite the third surface, the second and third surfaces facing each other to define a gap;
an antireflective electrode stack coupled to the second surface or the third surface, the antireflective electrode stack comprising:
a conductive layer formed of a transparent conductive oxide;
an overcoat layer in contact with the electro-optic medium and formed of a substantially transparent conductive material;
an insulating layer between the conductive layer and the overcoat layer; and
at least one conduction well at least partially containing the electro-optic medium and extending through the insulating layer.

18. The electro-optic assembly of claim 17, wherein the at least one conduction well includes a plurality of conduction wells that cover less than 1% of the antireflective electrode stack.

19. The electro-optic assembly of claim 17, wherein the antireflective electrode stack has a reflectance in the visible spectral range lower than 2% and a color saturation C* less than 5.

20. The electro-optic assembly of claim 17, wherein the overcoat layer has a thickness between 5 nm and 50 nm.

\* \* \* \* \*